July 12, 1932.  K. E. WENZEL  1,867,534
RAIL BRAKE
Filed Jan. 11, 1929  2 Sheets-Sheet 1
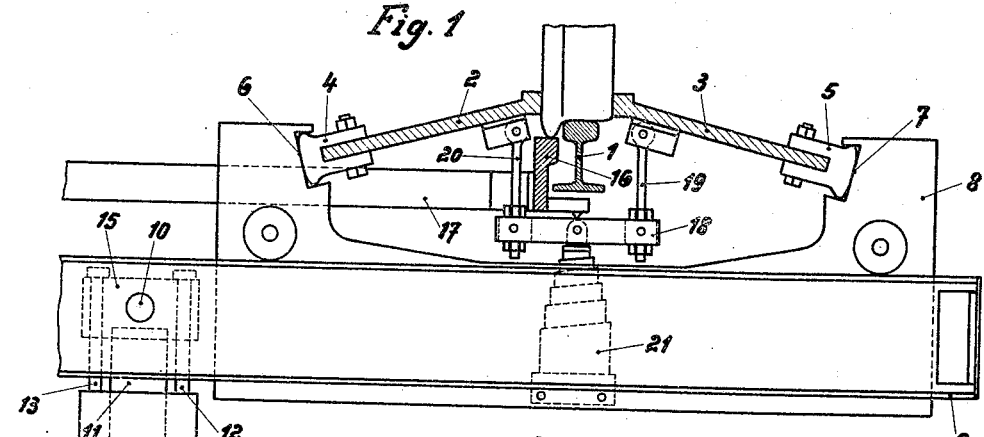
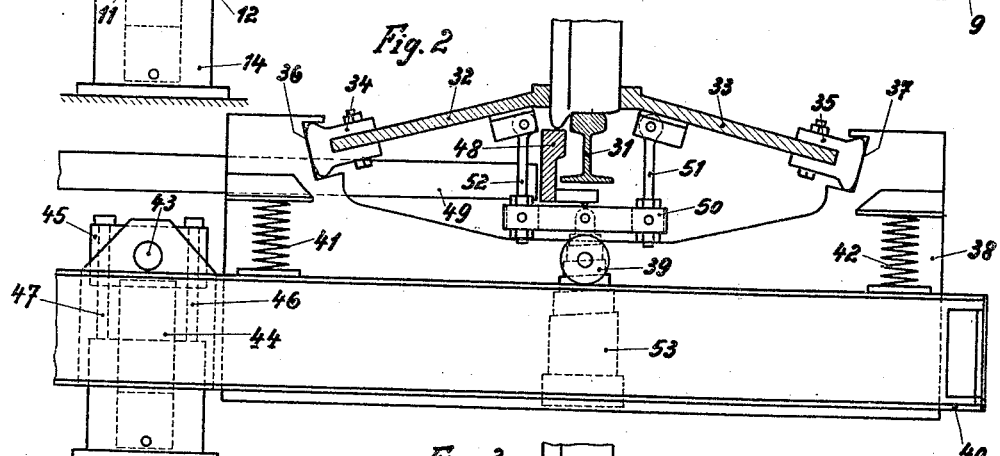
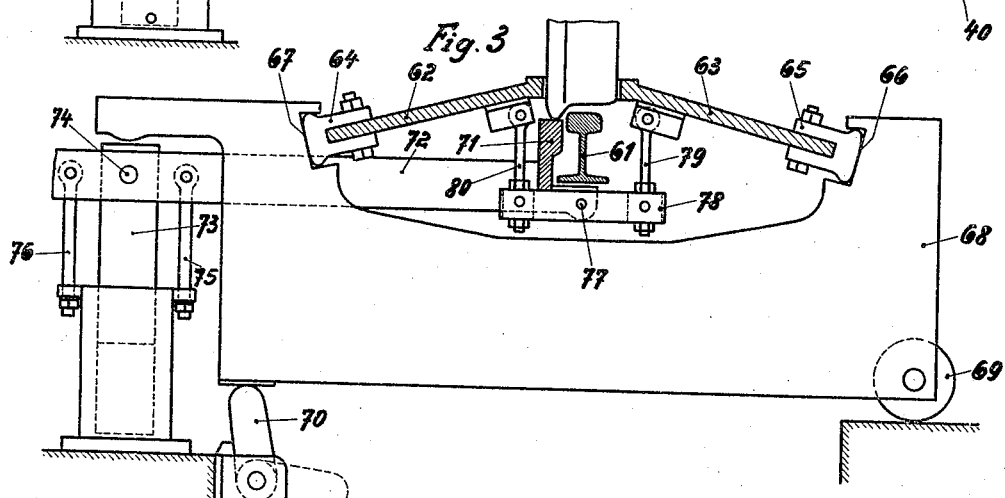

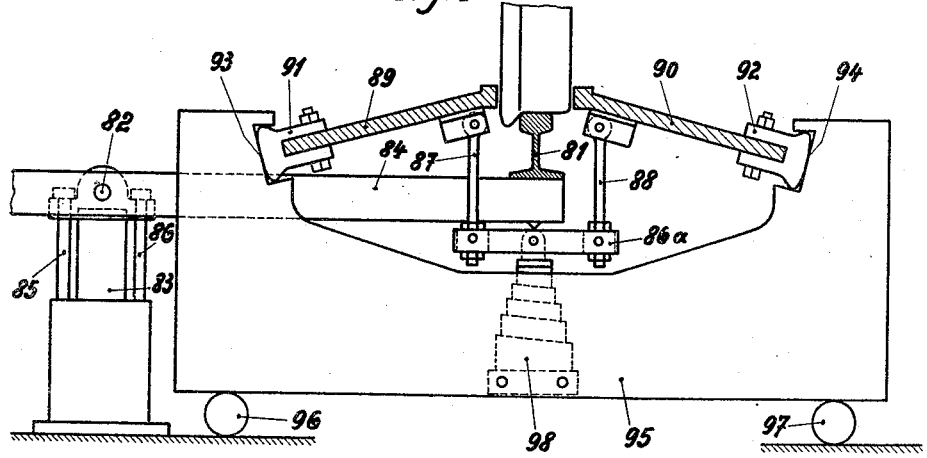
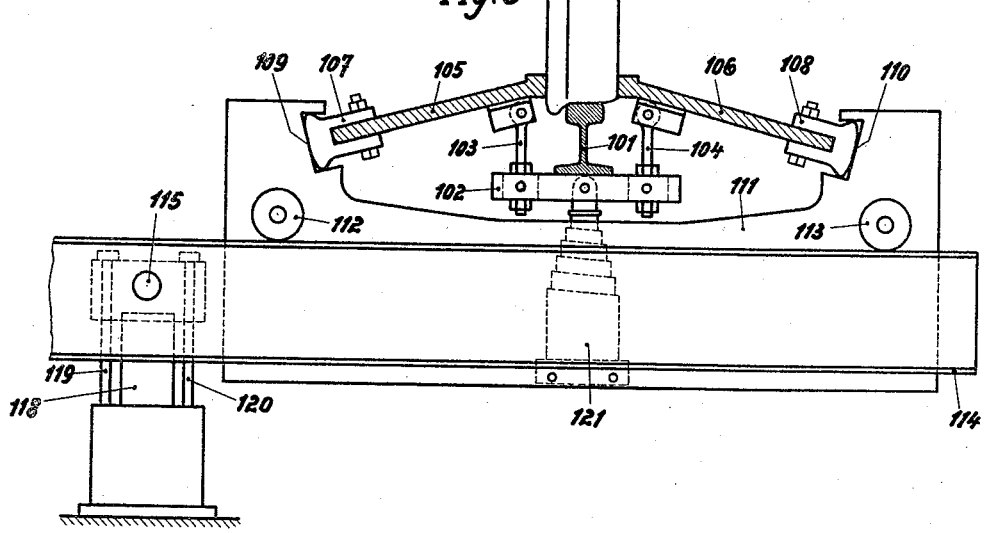

Patented July 12, 1932

1,867,534

UNITED STATES PATENT OFFICE

KARL ERNST WENZEL, OF HAMBORN, GERMANY, ASSIGNOR, BY MESNE ASSIGNMENTS TO THE FIRM: VEREINIGTE STAHLWERKE AKTIENGESELLSCHAFT, OF DUSSELDORF, GERMANY

RAIL BRAKE

Application filed January 11, 1929, Serial No. 331,918, and in Germany January 18, 1928.

Track brakes are known, in which the dependency of the maximum braking effect to the car weight for preventing derailment and for limiting the maximum retardation is obtained in that the wheels of the vehicle run onto the feet of tippably mounted brake rails. The brake carriers, which are tippably arranged on suitable carrying elements on either side of the track rail, are so constructed that they allow on the one hand the wheels to run onto a projecting lower part of the brake carrier, and on the other hand the upper part of the brake carrier (head) is used at the same time as brake rod. As the braking effect is the greater, the higher the brake rods engage above the upper edge of the rail or in relation to the wheel above the tread circle, the brake carriers, in which the ramp for the wheels for rendering effective the car weight and the brake rods are combined in a single profile, possess comparatively great height and therefore a great rigidity against sagging in the vertical plane. For producing the braking force only the arrangement of a tippably mounted brake carrier is necessary for each wheel side, whereas the other brake carrier may be rigidly mounted. The closed circuit of the brake rails to the wheel tire is dependent in relation to the height position of the brake system upon the thickness of the tire, that is the fulcrum of the tippable brake rail lies the higher relative to the upper edge of the rail, the thinner the tire is, because the head of the brake rail has to travel a longer distance before it comes to bear as a braking rod. This however results in that the braking height zone of the rigidly mounted brake carrier changes its height position relative to the wheel, namely lies lower with thicker tires than with thinner tires. An undesirable variation of the braking effect lies in this braking play stroke relative to the height engagement. The above described arrangement is however allowable as long as the braking zone can in itself lie comparatively high relative to the wheel tire in view of the car profile, such as for example with the continental railway systems. The above mentioned effect is however the more undesirable, the lower the braking engagement zone lies to the wheel tire in view of the car profile, such as for example on the American railways, on which, in view of the construction of the axle boxes situated in the bogies, the braking rails may only engage about 2" above the rail surface. If moreover abnormally high wheel tolerances also occur, the play stroke increases in dependency upon the wheel tolerances and transmission ratio of the tippable rail to such an extent that under certain circumferences a stationary brake carrier no longer comes to bear on the wheel tire. In such instances it must be endeavoured to overcome this objection by maintaining the braking height constant to the wheel.

According to the invention this is attained in that, for each wheel side, two tippable brake carriers are arranged. The known construction do not show this system idea, they do not acknowledge the reason for such an arrangement. If they do really have two tippable brake rails, this is only a form of construction in order to convert in the simplest manner the wheel pressure into pressing on pressure.

The invention on the one hand takes intentionally into consideration these relationships between the wheel tolerances and the braking engagement height zone and on the other hand the transmission ratio of the tippable braking rails and thereby obtains a considerable progress by recognizing the organic dependencies.

The above mentioned wheel tolerances, as has been shown by the foregoing statements, necessitate saggings in the vertical plane, which are the greater the thicker the tires are. The great rigidity of the brake carriers, in which, for rendering effective the car weight, the element for the wheel ramp and the braking plate are united in a single section part, acts however against the necessary sagging. As on the other hand great resistance moments are necessary for absorbing the horizontal pressing on forces, such brake carriers are not capable of making the necessary distortions to come to bear also on thin tires, they are less capable of making these distortions, the shorter the distances between the wheels are, such as for example on the American cars, owing to the bogey arrangement. The bearing also on thin tires is however necessary, if such an axle is not to be omitted for braking. In order to obviate this objection it must therefore be endeavoured to keep low the moment of inertia relative to the horizontal plane, which however is not well possible with the above mentioned and known types of construction, in which the ramp element and braking rod are united in a single part.

This invention endeavours to satisfy this requirement of great elasticity in that it provides a separation between the element necessary for the ramping and the brake rod proper, by providing a separate ramping element, a separately arranged ramp rail, for rendering effective the car weight and therefore makes it possible to provide brake carriers which are suitable for elastic deformation.

The arrangement of a separate ramp rail is also known, but only as a supplementary element in the brake construction in order to make the car weight cooperate. The construction and the invention are based on the system of a so-called two-force brake, which works without cooperation of the car weight. In the known constructions of this type the idea, which contains the foregoing fundamental explanations, is entirely unknown. They neither depart from the three-force brake nor have the inventive ideas set forth in the application been organically recognized for the requirements, according to the above considerations. As regards the form of construction, the brake rails in the known construction are arranged on two-armed supporting levers, which oscillate on stationary points, and which are actuated by a strut arrangement on which the wheel load acts by means of the ramp rail. The conversion of the wheel load is therefore effected indirectly through the interpositioning of an intermediate gearing, whereas, according to the invention, the car weight is transmitted directly to the brake carriers by means of a separately arranged ramp rail and thereby converted into application force.

The forms of construction illustrated have in common the double-sided arrangement of the tippable brake rods which, by means of roller bearings, bear on bows for taking up the application pressures. They have further in common the arrangement of a suspension which allows the wheel load transmitted from the ramp rail or from the track rail to act directly on the brake rods. The bows are supported by any suitable carrying elements. The operation is effected in that the wheel runs with one wheel flange onto the ramp rail of the suspension and consequently engages the elastic brake rods having a low inertia moment until the brake edges come to bear on the wheel tires. The ramp rails are transversely reinforced mutually by suitable means.

In Figs. 1, 2 and 5 the so-called normal braking principle is employed according to which the controlling force of the piston acts directly on the bows and thus on the brake carriers. The bows and therefore the supporting points of the brake rails are consequently arranged vertically movable.

In Figs. 3 and 4 the so-called reversed braking principle is represented. The bows and the brake carriers are firmly arranged and do not vary their position relative to the rail. The member subjected to control is the ramp rail. Whereas in the arrangement shown in Figs. 1, 2 and 5 the braking force is directly proportional to the controlling force of the piston, conditions are reversed in Figs. 3 and 4 where the braking force is indirectly proportional to the controlling force, i. e., the greater the piston force, the more weight is taken off and the less wheel load is converted into braking force. In the extreme case in which the controlling force and thus, owing to the ramp rail disposed laterally of the track rail, the wheel load is taken off completely, the braking force will be zero.

According to Fig. 1, two brake carriers 2 and 3 are arranged along the rail 1 and movably supported relative to the abutments 6 and 7 of the bow 8 by the rolling caps 4 and 5. The bow 8 is carried by the beam 9 connected with the controllable piston 11 by the bolt 10, the stroke of the piston 11 being limited relative to the cylinder 14 by the rods 12 and 13 and the head piece 15. On the side of the rigid rail 1 a separate ramp rail 16 is disposed and combined into a unit with the oppositely disposed ramp rail by the cross ties 17 arranged at a distance from one another. The ramp rail 16 rests on the cross member 18 connected with the tiltable carriers 2 and 3 by the draw bars 19 and 20. To keep the braking groove ready for operation, the suspension represented by the cross member 18 as well as the draw bars 19 and 20 and the brake carriers 2 and 3 are supported by a spring 21 secured to the bow 8.

According to the arrangement shown in Fig. 2 two tippable brake carriers 32 and 33 are positioned along the rail 31 and hug the rolling surfaces 36 and 37 of the bow 38 with their caps 34 and 35. The bow 38 is centrally arranged on the beam 40 by means of the roll 39 and poised by the lateral spring supports 41 and 42, the beam 40 being connected with the piston 44 by the bolt 43 and with the head piece 45. The stroke of the piston 44 is limited by the draw bars 46 and 47 of the cylinder. Along the rail 31 the ramp rail 48 is provided and combined with the opposite or companion ramp rail into a unit by means of the spaced transverse ties 49. The ramp rail 48 rests on the cross member 50 connected with the brake carriers 32 and 33 by the draw bars 51 and 52. To keep the braking groove ready for operation, the suspension comprising the cross member 50 and the draw bars 51 and 52 and therefore the brake carriers 32 and 33 are supported by the spring 53 secured to the bow 38.

In Fig. 3 two brake carriers 62 and 63 are arranged along the rail 61 and supported relative to the rolling faces 66 and 67 of the bow 68 by their roller bearings 64 and 65. The bow 68, on the outside, is firmly disposed on the level and capable of transverse displacement by means of the roll 69. When in braking position the bow 68 is supported on the inside by the joints 70. Along the rail 61 the ramp rail 71 is positioned and combined into a unit with the companion ramp rail by the spaced cross ties 72. The ramp rail 71 is connected by the cross ties 72 and the bolt 74 with the piston 73, the stroke of the piston being limited by the bars 75 and 76. The ramp rail unit 71, 72 is connected with the cross member 78 by the bolt 77, the cross member being connected by the draw bars 79 and 80 with the brake carriers 62 and 63. In order to place the brake in inoperative position to permit free passage of locomotives the piston 73 is lowered and the joint 70 reversed, so that the bow 68 swinging about the roll 69 is lowered inside.

According to Fig. 4, the rail 81, which can be raised and lowered, rests on the cross tie 84 connected with the piston 83 by the bolt 82, the stroke of the cross tie 84 and thus of the rail 81 being limited by the bars 85 and 86. The track unit 81, 84 rests with its ends on the cross member 86a connected with the brake carriers 89 and 90 by the draw bars 87 and 88. The brake carriers 89 and 90 are supported on the rolling faces 93 and 94 of the bow 95 by the rolling caps 91 and 92, the bow 95 being transversely displaceable by the rolls 96 and 97 while invariably maintaining the same level. The braking groove is kept in operative position by supporting the cross member 86 by the spring 98 secured to the bow 95.

In the construction shown in Fig. 5 the track 101 can be raised and lowered and rests on the cross member 102 connected with the brake carriers 105 and 106 by the draw bars 103 and 104. The brake carriers 105 and 106 are supported by the rolling caps 107 and 108 on the rolling faces 109 and 110 of the bow 111 which, by means of the rolls 112 and 113 permitting of transverse displacement, rests on the beam 114 which can be raised and lowered and which, by the bolt 115, is connected with the piston 118 whose stroke is limited by the draw bars 119 and 120. When in a position of rest with the beams 114 lowered, the track unit 101 with the cross member 102 is carried by the supporting spring 121 secured to the bow 111.

In all forms of construction the separately arranged ramp rail, or the track rail serving as ramp rail, may be arranged continuously rigid or articulated and divided as working elements for the co-operation of the car weight, in order, as in the latter instance, in view of the differences in the tires, to obtain greater elasticity.

What I claim, is:

1. A rail brake, the maximum braking effect of which is dependent upon the weight of the car, comprising a separately arranged ramp rail adapted to be acted upon by the wheel pressure when the car is running through the brake, an intermediate suspension depressed by the downward movement of said ramp rail, two tippable brake rods free of the ramp rail upon which the downward movement of said suspension is transmitted, and a bow in which said brake rods are mounted, being continuous and rigid in longitudinal direction and the controlling force engaging on said suspension.

2. A rail brake, the maximum braking effect of which is dependent upon the weight of the car, comprising a separately arranged ramp rail adapted to be acted upon by the wheel pressure when the car is running through the brake, an intermediate suspension depressed by the downward movement of said ramp rail, two tippable brake rods free of the ramp rail upon which the downward movement of said suspension is transmitted, and a bow in which said brake rods are mounted.

3. A rail brake, the maximum braking effect of which is dependent upon the weight of the car, comprising a separately arranged ramp rail adapted to be acted upon by the wheel pressure when the car is running through the brake, an intermediate suspension depressed by the downward movement of said ramp rail, two tippable brake rods free of the ramp rail upon which the downward movement of said suspension is transmitted, and a bow in which said brake rods are mounted, being continuous and rigid in longitudinal direction and the controlling force being transmitted to the bows supporting said brake rods.

4. A rail brake comprising in combination with a ramp rail and tippable brake rods, a suspension consisting of two pull rods engaging said brake rods near the braking surface, and a transverse girder under said pull rods.

5. A rail brake as specified in claim 1, in which the bow is arranged pendulating centrally mounted and laterally resiliently supported.

6. A rail brake as specified in claim 1, in which the bow is to one side, and a controllable supporting lever.

KARL ERNST WENZEL.